United States Patent
Maas et al.

(10) Patent No.: US 7,614,186 B2
(45) Date of Patent: Nov. 10, 2009

(54) MULTIWALL POLYMER SHEET WITH CELLS HAVING LIQUID AFFECTING SOLAR AND LIGHT TRANSMISSION

(75) Inventors: Chris Maas, Rilland (NL); Michel van Acht, Breda (NL); Fred Bartelen, Hoogerheide (NL); Jos Dekkers, Breda (NL)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 11/558,057

(22) Filed: Nov. 9, 2006

(65) Prior Publication Data

US 2008/0110108 A1 May 15, 2008

(51) Int. Cl.
*E04C 2/54* (2006.01)
(52) U.S. Cl. .................. 52/171.3; 52/784.14; 52/786.1; 52/788.1
(58) Field of Classification Search .................. 52/200, 52/782.1, 171.3, 783.1, 784.14, 788.1, 786.1, 52/786.11, 203; 359/591–595
See application file for complete search history.

(56) References Cited

U.S. PATENT DOCUMENTS

| | | | | |
|---|---|---|---|---|
| 3,953,110 A | * | 4/1976 | Charoudi | 52/203 |
| 3,981,294 A | * | 9/1976 | Deminet et al. | 52/786.11 |
| 4,053,210 A | * | 10/1977 | Michaelis | 359/595 |
| 4,108,373 A | * | 8/1978 | Chiapale et al. | 47/17 |
| 4,147,002 A | | 4/1979 | Kautz | |
| 4,148,296 A | | 4/1979 | Parlato | |
| 4,288,953 A | * | 9/1981 | Whiteford | 52/171.3 |
| 4,380,994 A | * | 4/1983 | Seemann | 126/431 |
| 4,521,077 A | | 6/1985 | Connelly | |
| 4,527,544 A | * | 7/1985 | Wolf et al. | 126/605 |
| 4,736,563 A | * | 4/1988 | Bilhorn | 52/460 |

(Continued)

FOREIGN PATENT DOCUMENTS

| | | |
|---|---|---|
| DK | 1006619 | 4/1957 |
| GB | 1227417 | 4/1971 |
| GB | 2239666 | 7/1991 |

OTHER PUBLICATIONS

ISO 9050 "Glass in building—Determination of light transmittance, solar direct transmittance, total solar energy transmittance, ultraviolet transmittance and related glazing factors" (32 pages).

(Continued)

*Primary Examiner*—Richard E Chilcot, Jr.
*Assistant Examiner*—Matthew J Smith
(74) *Attorney, Agent, or Firm*—Cantor Colburn LLP (57) ABSTRACT

Disclosed herein are multiwall sheeting and articles comprising multiwall sheeting. In one embodiment, a multiwall sheet comprises: greater than or equal to three polymer walls (e.g., comprising a first outer layer, a second outer layer, and an inner layer), a transverse layer, and a liquid. The liquid is located in cells formed by the transverse layer and the walls. The multiwall sheet has a first visible light transmission and a first direct solar transmission. A second multiwall sheet has the same materials and the same design as the multiwall sheet but with no liquid, and has a second visible light transmission and a second direct solar transmission. The first visible light transmission is greater than the second visible light transmission and the first direct solar transmission is about 63% to about 70% as determined in accordance with ISO 9050.

28 Claims, 3 Drawing Sheets

U.S. PATENT DOCUMENTS

| | | | |
|---|---|---|---|
| 5,580,620 A * | 12/1996 | Campbell et al. | 428/34 |
| 5,787,652 A | 8/1998 | Tai | |
| 6,179,948 B1 * | 1/2001 | Merrill et al. | 156/229 |
| 6,427,394 B1 | 8/2002 | Clodic | |
| 6,620,872 B2 * | 9/2003 | Fisher | 524/403 |
| 6,718,703 B2 | 4/2004 | Clark | |
| 6,931,796 B2 * | 8/2005 | Adriaansen et al. | 52/81.1 |

OTHER PUBLICATIONS

Frederik WB Hoolhorst et al.; U.S. Appl. No. 11/463,927, filed Aug. 15, 2006; "Polymer Sheeting"; Available in the Image File Wrapper (IFW).

* cited by examiner

MULTIWALL POLYMER SHEET WITH CELLS HAVING LIQUID AFFECTING SOLAR AND LIGHT TRANSMISSION

TECHNICAL FIELD

The present disclosure relates generally to polymer sheets, and more specifically to multiwall polymer sheets comprising liquid.

BACKGROUND

In the construction of naturally lit structures (e.g., greenhouses, pool enclosures, conservatories, stadiums, sunrooms, and so forth), glass has been employed in many applications as transparent structural elements, such as, windows, facings, and roofs. However, polymer sheeting is replacing glass in many applications due to several notable benefits.

One benefit of polymer sheeting is that it exhibits excellent impact resistance compared to glass. This in turn reduces maintenance costs in applications wherein occasional breakage caused by vandalism, hail, contraction/expansion, and so forth, is encountered. Another benefit of polymer sheeting is a significant reduction in weight compared to glass. This makes polymer sheeting easier to install than glass and reduces the load-bearing requirements of the structure on which they are installed.

In addition to these benefits, one of the most significant advantages of polymer sheeting is that it provides improved insulative properties compared to glass. This characteristic significantly affects the overall market acceptance of polymer sheeting as consumers desire a structural element with improved efficiency to reduce heating and/or cooling costs.

Although the polymer sheeting has many advantages over glass, there is a continuous demand enhanced optical properties, e.g., visible light transfer similar to glass and blocking of direct solar light.

BRIEF SUMMARY

Disclosed herein are multiwall sheeting and uses thereof. In one embodiment, a natural lit structure comprises a building structure and a roof comprising a multiwall sheet.

In one embodiment, a multiwall sheet comprises: greater than or equal to three polymer walls (e.g., comprising a first outer layer, a second outer layer, and an inner layer), a transverse layer, and a liquid. The liquid is located in cells formed by the transverse layer intersecting the walls. The multiwall sheet has a first visible light transmission and a first direct solar transmission. A second multiwall sheet has the same materials and the same design as the multiwall sheet with no liquid, and has a second visible light transmission and a second direct solar transmission. The first visible light transmission is greater than the second visible light transmission.

In another embodiment, a multiwall sheet comprises: three polymer walls (e.g., comprising a first outer layer, a second outer layer, and an inner layer), a transverse layer, and a liquid. The liquid is located in cells formed by the transverse layer intersecting the walls. The polymer walls comprise a polymer selected from the group consisting of polycarbonate, poly (methyl methacrylate), polyalkenes, polyetherimides, styrene, and combinations comprising at least one of the foregoing polymers. The multiwall sheet has a visible light transmission at a wavelength of about 400 nm to about 700 nm of greater than or equal to 87% as measured in accordance with ISO 9050.

In yet another embodiment, a multiwall sheet comprises: greater than or equal to three polymer walls (e.g., comprising a first outer layer, a second outer layer, and an inner layer), a transverse layer, and a liquid. The liquid is located in cells formed by the transverse layer intersecting the walls. The multiwall sheet has a visible light transmission at a wavelength of about 400 nm to about 700 nm of greater than or equal to 85% as measured in accordance with ISO 9050.

In still another embodiment, a multiwall sheet comprises: greater than or equal to two polymer walls; a transverse layer. The transverse layer intersects the walls to form cells, and a liquid is located in the cells. The transverse layer has a geometry selected from the group consisting of a cross geometry, a sinusoidal geometry, and combinations comprising at least one of the foregoing geometries. The multiwall sheet has a first visible light transmission and a first direct solar transmission. A second multiwall sheet has the same materials and the same design as the multiwall sheet with no liquid, and has a second visible light transmission and a second direct solar transmission. The first visible light transmission is greater than the second visible light transmission.

In yet another embodiment, a multiwall sheet comprises: greater than or equal to two polymer walls, a transverse layer. The transverse layer intersects the walls to form cells, and a liquid is located in the cells. The walls have a thickness of less than or equal to about 1 mm. The multiwall sheet has a thickness of less than or equal to about 55 mm and has a first visible light transmission and a first direct solar transmission. A second multiwall sheet has the same materials and the same design as the multiwall sheet except comprises no liquid, and has a second visible light transmission and a second direct solar transmission. The first visible light transmission is greater than the second visible light transmission.

In one embodiment, a method for producing a multiwall sheet comprises: forming at least two walls and a transverse layer therebetween and increasing visible light transmission through the multiwall sheet. The transverse layer intersects the walls to form cells.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Disclosed herein is polymeric sheeting that can offer improved light control, i.e., enhanced visible light (e.g., wavelength of 400 nanometers (nm) to 700 nm) transmission. In various applications, control of the type of light that transmits through the multiwall sheet and the light that is prevented from passing through the multiwall sheet can greatly affect the effectiveness of the sheet. For example, when the multiwall sheet is used as roofing for a natural lit structure (e.g., a greenhouse, pool enclosure, sun-room, etc.), admittance of visible light while rejecting direct solar light can substantially enhance crop growth; e.g., a 1% increase in visible light transmission can enhance crop growth by 1%. Direct solar transmission, however, can damage crops. The present multiwall sheet increases visible light transmission.

This multiwall sheet comprises liquid between the walls. With the liquid in the walls, this sheet has a greater than or equal to 5% increase in visible light transmission (measured in accordance with NEN-EN-410-65 which is equivalent to ISO 9050) and a direct solar light transmission of less than or equal to 68% (measured in accordance with NEN-EN-410, which is equivalent to ISO 9050). As used herein, ISO 9050 refers to ISO 9050, second edition, Aug. 15, 2003 (reference number ISO 9050:2003(E)) with a perpendicular measurement. The visible light testing used illuminant D65.

The multiwall sheet can be used in various applications. For example, a greenhouse can comprise a building structure and a roof comprising the multiwall sheet. In one embodiment, a multiwall sheet comprises: greater than or equal to two, or more particularly, greater than or equal to three polymer walls (e.g., comprising a first outer layer, a second outer layer, and an inner layer, wherein the polymer walls can be disposed substantially parallel to one another (e.g., they can be disposed such that they do not intersect)), a transverse layer, and a liquid. The liquid is located in cells formed by the transverse layer intersecting the walls. The multiwall sheet has a first visible light transmission and a first direct solar transmission. A second multiwall sheet has the same materials and the same design as the multiwall sheet with no liquid, and has a second visible light transmission. The first visible light transmission is greater than the second visible light transmission and the first direct solar transmission is about 63% to about 70% as determined in accordance with ISO 9050. In some embodiments the first visible light transmission, at a wavelength of about 400 nm to about 700 nm, is greater than or equal to 85% as measured in accordance with ISO 9050, and the first direct solar light transmission is about 65% to about 68% as measured in accordance with ISO 9050.

In another embodiment, a multiwall sheet comprises: three polymer walls (e.g., comprising a first outer layer, a second outer layer, and an inner layer), a transverse layer, and a liquid. The liquid is located in cells formed by the transverse layer intersecting the walls. The polymer walls comprise a polymer selected from the group consisting of polycarbonate, poly (methyl methacrylate), polyalkenes, polyetherimides, styrene, and combinations comprising at least one of the foregoing polymers. The multiwall sheet has a visible light transmission at a wavelength of about 400 nm to about 700 nm of greater than or equal to 87% as measured in accordance with ISO 9050, and a direct solar light transmission of about 63% to about 70% as determined in accordance with ISO 9050.

In yet another embodiment, a multiwall sheet comprises: greater than or equal to three polymer walls (e.g., comprising a first outer layer, a second outer layer, and an inner layer), a transverse layer, and a liquid. The liquid is located in cells formed by the transverse layer intersecting the walls. The multiwall sheet has a visible light transmission at a wavelength of about 400 nm to about 700 nm of greater than or equal to 85% as measured in accordance with ISO 9050, and a direct solar light transmission of about 65% as to about 68% as measured in accordance with ISO 9050.

In still another embodiment, a multiwall sheet comprises: greater than or equal to two polymer walls; a transverse layer. The transverse layer intersects the walls to form cells, and a liquid is located in the cells. The transverse layer has a geometry selected from the group consisting of a cross geometry, a sinusoidal geometry, and combinations comprising at least one of the foregoing geometries. The multiwall sheet has a first visible light transmission and a first direct solar transmission. A second multiwall sheet has the same materials and the same design as the multiwall sheet with no liquid, and has a second visible light transmission and a second direct solar transmission. The first visible light transmission is greater than the second visible light transmission and the first direct solar transmission is about 63% to about 70% as determined in accordance with ISO 9050.

In yet another embodiment, a multiwall sheet comprises: greater than or equal to two polymer walls, a transverse layer. The transverse layer intersects the walls to form cells, and a liquid is located in the cells. The walls have a thickness of less than or equal to about 1 mm. The multiwall sheet has a thickness of less than or equal to about 55 mm and has a first visible light transmission and a first direct solar transmission. A second multiwall sheet has the same materials and the same design as the multiwall sheet except comprises no liquid, and has a second visible light transmission. The first visible light transmission is greater than the second visible light transmission and the first direct solar transmission is about 63% to about 70% as determined in accordance with ISO 9050.

In some embodiments, the multiwall sheet can have a visible light transmission, as measured in accordance with ISO 9050, that is greater than or equal to 86%, or, more specifically, greater than or equal to 87%. The multiwall sheet can also have a direct solar light transmission, as measured in accordance with ISO 9050, that is about 65% to about 68%. The liquid can be water, glycerin, polydimethylsiloxane oil, as well as combinations comprising at least one of the foregoing liquids, such as demineralized water. Additionally, the multiwall sheet can have an overall thickness of less than or equal to 55 mm (e.g., from the outside of the first outside layer to the outside of the second outside layer). The multiwall sheet can also comprise a first manifold located at an end of the sheet in fluid communication with the cells.

The polymer of the polymer walls can be polyalkylenes, polycarbonates, acrylics, polyacetals, styrenes, poly(meth)acrylates, polyetherimide, polyurethanes, polyphenylene sulfides, polyvinyl chlorides, polysulfones, polyetherketones, polyether etherketones, polyether ketone ketones, and combinations comprising at least one of the foregoing. For example, the polymer can be acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether, as well as combinations comprising at least one of the foregoing polymers.

The number of layers of the multiwall sheet is dependent upon customer requirements such as structural integrity, overall thickness, light transmission properties, and insulative properties. The thickness of the sheets can be up to about 55 millimeters (mm) or even thicker, or more specifically about 1 mm to about to about 45 mm, or, even more specifically, about 3 mm to about 35 mm, or, even more specifically, about 3 mm to about 25 mm, and yet more specifically, about 5 to about 15 mm. The multiwall sheets have at least 2 layers, or more specifically, greater than or equal to 3 layers (e.g., main layers) (e.g., see FIGS. 1-5, walls 2), or, even more specifically, about 3 layers to about 10 layers, and, yet more specifically, about 4 layers to about 8 layers. The layers can each have a thickness of less than or equal to about 1 mm, or, more specifically, about 0.2 mm to about 0.8 mm, or, even more specifically, about 0.3 mm to about 0.6 mm.

Additionally, the sheet has a sufficient number of transverse layers to attain the desired structural integrity. In addition to the main layers and the transverse layers (dividers) can be employed (e.g., see FIGS. 1-5, transverse layers 4). The dividers can have various geometries such as perpendicular (e.g., see FIGS. 1 and 3) a cross (e.g., X) geometry (e.g., see FIGS. 2 and 5, X dividers 6), a sinusoidal geometry (e.g., see FIG. 4, sinusoidal divider 8), as well as any other geometry and combinations comprising at least one of these geometries. The transverse layers can each have a thickness of less than or equal to about 1 mm, or, more specifically, about 0.2 mm to about 0.8 mm, or, even more specifically, about 0.25 mm to about 0.6 mm.

In one embodiment, a method for producing a multiwall sheet comprises: forming at least two walls and a transverse layer therebetween and increasing visible light transmission through the multiwall sheet while attaining a direct solar transmission of less than or equal to about 68%. For example, the method can comprise increasing the visible light transmission by greater than or equal to about 10%, or, more specifically, increasing the visible light transmission by greater than or equal to about 13%. The forming can comprising forming the walls and transverse layer, individually, to have a thickness of about less than or equal to about 1 mm, or, more specifically, about 0.2 mm to about 0.8 mm, or, even more specifically, about 0.25 mm to about 0.6 mm. The transverse layers can also have a geometry such as cross, sinusoidal, and combinations comprising at least one of these geometries.

Figure 1:
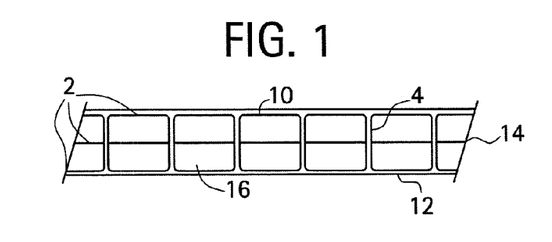
FIG. 1 is a partial cross-sectional view of an exemplary 3 layer multiwall sheet.

Referring now to FIG. 1, a partial cross-sectional view of an exemplary multiwall has main layers 2 comprising a first outside layer (e.g., a top layer) 10 and a second outside layer (e.g., bottom layer) 12 that are connected by transverse layers (e.g., ribs) 4. The top layer 10 and the bottom layer 12, as well as inner layer(s) 14, are generally parallel with respect to each other. The transverse layer(s) 8 are generally disposed between, and normal to, the top layer 10 and the bottom layer 12.

Figure 7:
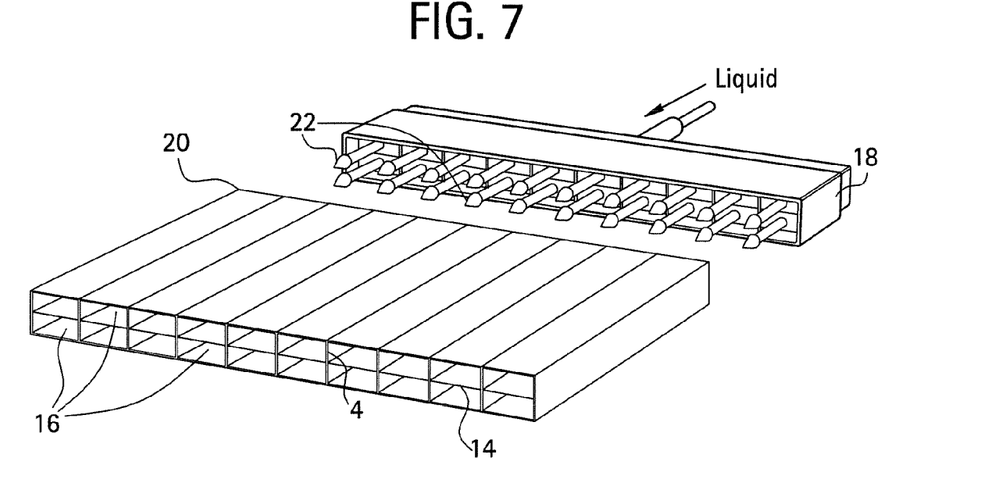
FIG. 7 is an expanded prospective view of an exemplary multiwall sheet with a manifold.

The multiwall sheet comprises multiple cells 16 that are defined by adjacent transverse layers 4 and layers 2, with each sheet 2 comprising a plurality of the cells 16. A portion or all of these cells 16 can be filled with a liquid. For simplicity of transportation and installation, the liquid can be disposed into the sheets after the sheet has been positioned in a desired location. Introduction of the liquid to the cells 16 can be accomplished with manifold(s) and air release(s). Referring to FIG. 7, the manifold 18 can be oriented in fluid communication with the cells 16 at one end 20 of the sheet, and an air release (not shown) can be located at the other end of the sheet. As the liquid is introduced to the sheet (illustrated by arrows 22) through the manifold 18, air escapes the opposite end of the sheet. Once the desired number of cells have been filled with the liquid, the manifold can be removed and the sheet can be sealed on both ends to retain the liquid. Optionally, the manifold can be retained and the liquid can be introduced and removed from the sheet as desired, e.g., depending upon the season, weather conditions, condition of the liquid (e.g., desire to filter and/or clean the liquid), need to repair and/or replace a particular sheet or portion thereof, and so forth. For example, the liquid (e.g., water) can flow through channels between the walls, e.g., entering via one side and leaving the sheet via the other side, and/or even entering and leaving the sheet via the same side of the sheet (such as the bottom). In some embodiments, the liquid is introduced to specific areas of the sheet while not disposed in others, depending upon the sheets orientation to the sun, and/or specific requirements of the various portions of the sheet.

The liquid introduced to the sheet can be any liquid that has the desired transmission properties (e.g., transparent to visible light (for example, has a transmission of greater than or equal to 95%), and desirably, less transparent (or opaque) to direct solar light), and does not react with the layer material(s). Possible liquids include water (e.g., demineralized water, water having a neutral pH (e.g., pH of about 6.5 to about 7.5), as well as combinations comprising at least one of these properties), glycerin, polydimethylsiloxane oil, transparent gels, and so forth, as well as combinations comprising at least one of the foregoing. Depending upon the environmental conditions that will affect the sheet (and hence the liquid), additive(s) can be mixed with the liquid, such as anti-freeze additives (e.g., to prevent freezing in the winter), antimicrobial agents, and so forth, as well as combinations comprising at least one of the foregoing.

The amount of liquid employed in the sheet is dependent upon the desired properties, e.g., as noted above, some of the areas of the sheet can be filled while others can be free of liquid. To enhance the visible light transmission, desirably, all of the cells are filled with the liquid.

The sheet comprises a polymeric layer material. Exemplary polymeric layer materials comprise thermoplastics including polyalkylenes (e.g., polyethylene, polypropylene, polyalkylene terephthalates (such as polyethylene terephthalate, polybutylene terephthalate)), polycarbonates, acrylics, polyacetals, styrenes (e.g., impact-modified polystyrene, acrylonitrile-butadiene-styrene, styrene-acrylonitrile), poly (meth)acrylates (e.g., polybutyl acrylate, polymethyl methacrylate), polyetherimide, polyurethanes, polyphenylene sulfides, polyvinyl chlorides, polysulfones, polyetherketones, polyether etherketones, polyether ketone ketones, and so forth, as well as combinations comprising at least one of the foregoing. Exemplary thermoplastic blends comprise acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyethylene/nylon, polyethylene/polyacetal, and the like. However, in the specific embodiment illustrated, it is envisioned a polycarbonate material is employed, such as those designated by the trade name Lexan®, which are commercially available from the General Electric Company, GE Plastics, Pittsfield, Mass.

Additives can be employed to modify the performance, properties, or processing of the polymeric material. Exemplary additives comprise antioxidants, such as, organophosphites, for example, tris(nonyl-phenyl)phosphite, tris(2,4-di-t-butylphenyl)phosphite, bis(2,4-di-t-butylphenyl) pentaerythritol diphosphite or distearyl pentaerythritol diphosphite, alkylated monophenols, polyphenols and alkylated reaction products of polyphenols with dienes, such as, for example, tetrakis[methylene(3,5-di-tert-butyl-4-hydroxyhydrocinnamate)]methane, 3,5-di-tert-butyl-4-hydroxyhydrocinnamate octadecyl, 2,4-di-tert-butylphenyl phosphite, butylated reaction products of para-cresol and dicyclopentadiene, alkylated hydroquinones, hydroxylated thiodiphenyl ethers, alkylidene-bisphenols, benzyl compounds, esters of beta-(3,5-di-tert-butyl-4-hydroxyphenyl)-propionic acid with monohydric or polyhydric alcohols, esters of beta-(5-tert-butyl-4-hydroxy-3-methylphenyl)-propionic acid with monohydric or polyhydric alcohols; esters of thioalkyl or thioacyl compounds, such as, for example, distearylthiopropionate, dilaurylthiopropionate, ditridecylthiodipropionate, amides of beta-(3,5-di-tert-butyl-4-hydroxyphenyl)-propionic acid; fillers and reinforcing agents, such as, for example, silicates, fibers, glass fibers (including continuous and chopped fibers), mica and other additives; such as, for example, mold release agents, UV absorbers, stabilizers such as light stabilizers and others, lubricants, plasticizers, pigments, dyes, colorants, anti-static agents, blowing agents, flame retardants, impact modifiers, among others.

The specific polymer chosen will be capable of providing sufficient light transmission. For example, the polymer can provide a transmission of visible light of greater than or equal to about 70%, or, more specifically, greater than or equal to about 80%, even more specifically, greater than or equal to about 85%, as tested per ASTM D-1003-00 (Procedure B, Spectrophotometer, using illuminant C with diffuse illumination and unidirectional viewing). Transmission is defined as:

$$\%T = \left(\frac{I}{I_O}\right) \times 100\% \quad \text{(II)}$$

wherein: I=intensity of the light passing through the test sample $I_o$=Intensity of incident light In addition to transmission, the polymeric material can be chosen to exhibit sufficient impact resistance such that the sheet is capable of resisting breakage (e.g., cracking, fracture, and the like) caused by impact (e.g., hail, birds, stones and so forth). Therefore, polymers exhibiting an impact strength greater than or equal to about 7.5 foot-pounds per square inch, ft-lb/in$^2$ (4.00 joules per square centimeter, J/cm$^2$), or more specifically, greater than about 10.0 ft-lb/in$^2$ (5.34 J/cm$^2$) or even more specifically, greater than or equal to about 12.5 ft-lb/in$^2$ (6.67 J/cm$^2$) are desirable, as tested per ASTM D-256-93 (Izod Notched Impact Test). Further, desirably, the polymer has ample stiffness to allow for the production of a sheet that can be employed in applications wherein the sheet is generally supported and/or clamped on two or more sides of the sheet (e.g., clamped on all four sides), such as in greenhouse applications comprising tubular frame construction. For example, a molded test bar of the polymer(s) can comprise a Young's modulus (e.g., modulus of elasticity) that is greater than or equal to about 200,000 pounds per square inch, psi (14,061 kilograms per centimeter squared (kg/cm$^2$)), or more specifically, greater than or equal to about 250,000 psi (17,577 kg/cm$^2$), or even more specifically, greater than or equal to about 300,000 psi (21,092 kg/cm$^2$).

EXAMPLES

Figure 2:
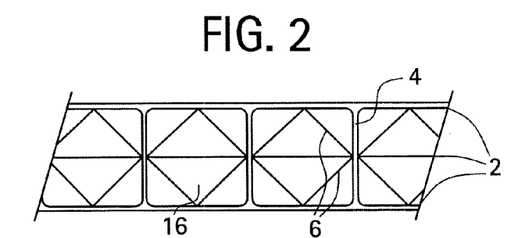
FIG. 2 is a partial cross-sectional view of an exemplary 3 layer multiwall sheet that, due to the X dividers, mimics a 5 layer multiwall sheet.
Figure 3:
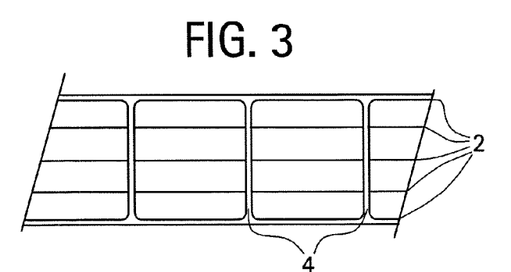
FIG. 3 is a partial cross-sectional view of an exemplary 4 layer multiwall sheet.
Figure 4:
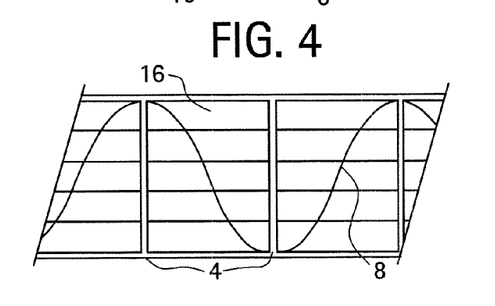
FIG. 4 is a partial cross-sectional view of an exemplary multiwall 5 layer sheet that, due to the sinusoidal divider, mimics a 7 layer multiwall sheet.
Figure 5:
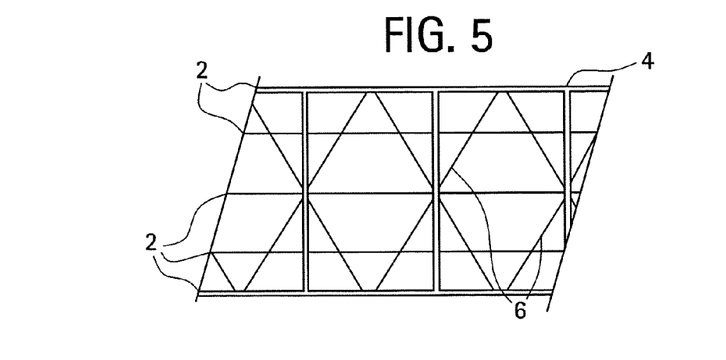
FIG. 5 is a partial cross-sectional view of an exemplary 4 layer multiwall sheet that, due to the X dividers, mimics a 7 layer multiwall sheet.

The light transmission of various multiwall sheets with and without liquid were tested. The sheets all had an overall thickness of 16 millimeters (mm). The sheets that were tested had 2 layers (Sample 1), 3 layers as is illustrated in FIG. 1 (Sample 2), 3 layers with X dividers as is illustrated in FIG. 2 (Sample 3), and 6 layers with sinusoidal dividers as is illustrated in FIG. 4 (Sample 4). The distance between the transverse layers was 20 mm for Samples 2 and 4, and 16 mm for Samples 1 and 3. The light transmission for the visible light was tested in accordance with ISO 9050, while the light transmission for the solar light (i.e., direct was also tested in accordance with ISO 9050. The light transmission was using a Transvision measuring system in accordance with the Transvision system Manual and description, January 2004 (commercially available Innovations B.V., Netherlands). For the filled tests, all of the cells were demineralized water.

TABLE

| Sample | Light Transmission Unfilled | Light Transmission Filled | Direct Solar Transmission Unfilled | Direct Solar Transmission Filled |
|---|---|---|---|---|
| 1 | 77% | 85% | 73% | 68% |
| 2 | 75% | 88% | 70% | 67% |
| 3 | 67% | 87% | 63% | 66% |
| 4 | 56% | 85% | 53% | 66% |

Figure 6:
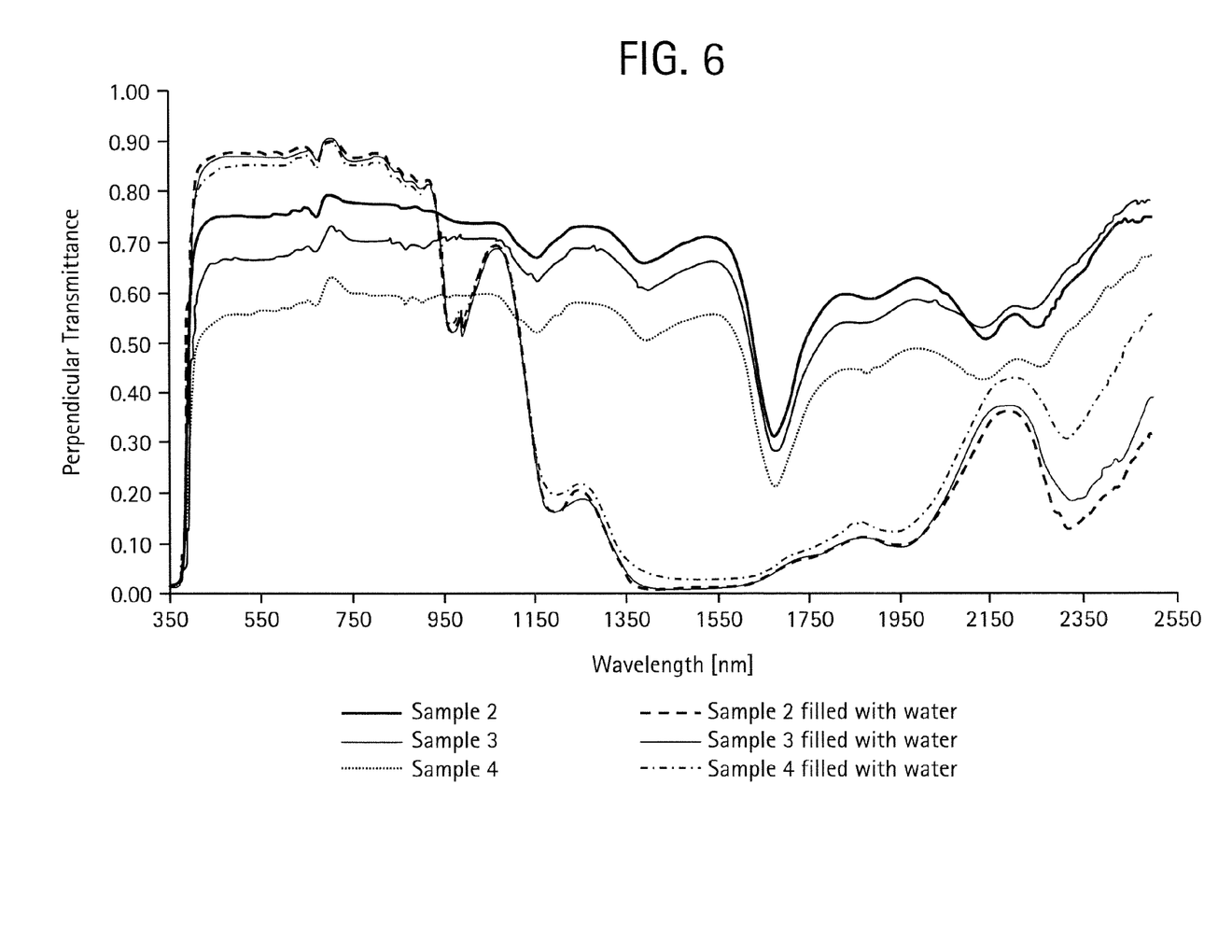
FIG. 6 is a graphical representation of various light transmissions for various multiwall sheets with and without liquid in the chambers.

As you can see from the table, and as is illustrated graphically in FIG. 6, the filled samples had increased visible light transmission compared to the unfilled samples. It is also noted that, for the same thickness multiwall sheet (all samples had a thickness of 16 mm), the more layers, the greater the improvement of the filled samples. For example, Sample 2 (3 layers), had an unfilled light transmission of 75% with a filled transmission of 88% (i.e., an increase of 13%), while Sample 4 (6 layers), had an unfilled light transmission of 56% with a filled transmission of 86% (i.e., an increase of 30%).

It is further noted that, even though visible light transmission is increased for the filled samples, unexpectedly, direct solar transmission is 66% to 68%, regardless of the number of layers or design of the transverse layers, and regardless of the unfilled solar transmission. For example, Sample 2 (3 layers), had an unfilled direct solar light transmission of 70% with a filled transmission of 67% (i.e., a decrease of 3%), while Sample 4 (6 layers), had an unfilled direct solar transmission of 53% with a filled transmission of 66% (i.e., an increase of 13%). It was very unexpected that visible light transmission could be enhanced while direct solar transmission would remain at about 65% to about 68% for all samples having the same overall sheet thickness. It was further unexpected that as the number of layers increased, the benefits of the liquid filled samples increased.

It has also been discovered that the refractive index (R.I.) of the liquid does not affect the transmission, but the number of sheets does affect the visible light transmission. For example, polycarbonate multiwall sheets, Sample 5 with water (R.I. of 1.33) and Sample 6 with glycerin (R.I. of 1.47 (water free—specific gravity of 1.26)) were tested for light transmission. Similar light transmissions were obtained. The improvement in light transmission for Sample 5 was 12.8% and for Sample 6 was 12.9%, as measured in accordance with ASTM D1033 (year 1977) using a BYK-Gardner, haze-gard dual spectrophotometer (Illuminant C with perpendicular measurement).

With the filled multilayer sheet, visible light transmissions (e.g., transmissions at a wavelength of 400 nanometers (nm) to 700 nm) of greater than or equal to about 85%, or, more specifically, greater than or equal to 86%, or, even more specifically, greater than or equal to 87% (measured in accordance with ISO 9050), while attaining a direct solar transmission (e.g., transmissions at a wavelength of 300 nm to 2,500 nm) of less than or equal to about 70%, or, more specifically, about 63% to about 70%, or, even more specifically, about 66% to about 68%. In other words, the visible light transmission can be increased by greater than or equal to 10%, and even greater than or equal to 13%, and more, compared to a multiwall sheet that is identical except that the cells do not have liquid. Since a 1% increase in light transmission equates to a 1% increase in crop growth in a green house, every percent increase in visible light transmission is very significant.

Additionally, since the present multiwall sheets inhibit the transfer of direct solar light (i.e., heat), these sheets enable enhanced control the climate below the filled sheet (e.g., in the greenhouse interior). Furthermore, since the liquid can be used to store energy (generated by the heat), additional savings can be realized. For example, the liquid can be used in wintertime to heat the greenhouse.

It is also noted that although the present multilayer sheeting is specifically discussed with relation to naturally lit structures (e.g., greenhouses, sun-rooms, and pool enclosures), the polymeric sheeting can be envisioned as being employed in any application wherein a polymer sheet is desired having a multiwall design. Exemplary applications comprise sunroofs, canopies, shelters, windows, lighting fixtures, sun-tanning beds, stadium roofing, and so forth.

Ranges disclosed herein are inclusive and combinable (e.g., ranges of "up to about 25 wt %, or, more specifically, about 5 wt % to about 20 wt %", is inclusive of the endpoints and all inner values of the ranges of "about 5 wt % to about 25 wt %," etc.). "Combination" is inclusive of blends, mixtures, derivatives, alloys, reaction products, and so forth. Furthermore, the terms "first," "second," and so forth, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and can or can not be present in other embodiments. In addition, it is to be understood that the described elements can be combined in any suitable manner in the various embodiments.

While the sheeting have been described with reference to exemplary embodiments, it will be understood by those skilled in the art that various changes may be made and equivalents may be substituted for elements thereof without departing from the scope. In addition, many modifications may be made to adapt a particular situation or material to the teachings of the sheeting without departing from the essential scope thereof. Therefore, it is intended that the invention not be limited to the particular embodiment disclosed as the best mode contemplated for carrying out this invention, but that the invention will include all embodiments failing within the scope of the appended claims.

What is claimed is:

1. A multiwall sheet, comprising:
    greater than or equal to three non-intersecting polymer walls;
    a transverse layer, wherein the transverse layer intersects the walls forming cells; and
    a liquid located in the cells;
    wherein the multiwall sheet has a first visible light transmission and a first direct solar transmission;
    wherein a second multiwall sheet has a same material and a same design as the multiwall sheet except comprises no liquid, and has a second visible light transmission;
    wherein the first visible light transmission is greater than the second visible light transmission and the first direct solar transmission is about 63% to about 70% as determined in accordance with ISO 9050, second edition, Aug. 15, 2003 (reference number ISO 9050:2003(e)) with a perpendicular measurement; and
    wherein the liquid has a liquid refractive index and the polymer walls have a polymer refractive index, and wherein the liquid refractive index is different than the polymer refractive index.

2. The multiwall sheet of claim 1, wherein the first visible light transmission at a wavelength of about 400 nm to about 700 nm is greater than or equal to 85% as measured in accordance with ISO 9050.

3. The multiwall sheet of claim 1, wherein the first visible light transmission is greater than or equal to 86%.

4. The multiwall sheet of claim 3, wherein the first visible light transmission is greater than or equal to 87%.

5. The multiwall sheet of claim 1, wherein the first direct solar light transmission is about 66% to about 68%.

6. The multiwall sheet of claim 1, wherein the liquid is selected from the group consisting of water, glycerin, polydimethylsiloxane oil, and combinations comprising at least one of the foregoing.

7. The multiwall sheet of claim 6, wherein the liquid is demineralized water.

8. The multiwall sheet of claim 1, wherein the polymer walls comprise a polymer selected from the group consisting of polyalkylenes, polycarbonates, polyacetals, styrenes, polyetherimide, polyurethanes, polyphenylene sulfides, polyvinyl chlorides, polysulfones, polyetherketones, polyether etherketones, polyether ketone ketones, and combinations comprising at least one of the foregoing.

9. The multiwall sheet of claim 8, wherein the polymer is selected from the group consisting of acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether, and combinations comprising at least one of the foregoing polymers.

10. The multiwall sheet of claim 1, comprising an overall thickness of less than or equal to 55 mm.

11. The multiwall sheet of claim 1, further comprising a first manifold located at one end of the sheet in fluid communication with the cells.

12. The multiwall sheet of claim 1, wherein the difference in refractive index between the liquid refractive index and the polymer refractive index is greater than or equal to 0.11.

13. The multiwall sheet of claim 1, wherein the sheet comprises greater than or equal to four non-intersecting polymer walls.

14. The multiwall sheet of claim 1, wherein the sheet comprises greater than or equal to five non-intersecting polymer walls.

15. The multiwall sheet of claim 1, wherein the sheet comprises greater than or equal to six non-intersecting polymer walls.

16. A multiwall sheet, comprising:
greater than or equal to two polymer walls, wherein the walls have a thickness of less than or equal to about 1 mm;
a transverse layer, wherein the transverse layer intersects the walls to form cells; and
a liquid located in the cells;
wherein the multiwall sheet has a thickness of less than or equal to about 55 mm and has a first visible light transmission and a first direct solar transmission,
wherein a second multiwall sheet has a same material and a same design as the multiwall sheet except comprises no liquid, and has a second visible light transmission and a second direct solar transmission;
wherein the first visible light transmission is greater than the second visible light transmission and the first direct solar transmission is about 63% to about 70%; and
wherein the liquid has a liquid refractive index and the polymer walls have a polymer refractive index, and wherein the liquid refractive index is different than the polymer refractive index.

17. The multiwall sheet of claim 16, wherein the difference in refractive index between the liquid refractive index and the polymer refractive index is greater than or equal to 0.11.

18. A multiwall sheet, comprising:
greater than or equal to two polymer walls;
a transverse layer, wherein the transverse layer intersects the walls to form cells, and wherein the transverse layer has a geometry selected from the group consisting of a cross geometry, a sinusoidal geometry, and combinations comprising at least one of the foregoing geometries; and
a liquid located in the cells;
wherein the multiwall sheet has a first visible light transmission and a first direct solar transmission;
wherein a second multiwall sheet has a same material and a same design as the multiwall sheet except comprises no liquid, and has a second visible light transmission and a second direct solar transmission; and
wherein the first visible light transmission is greater than the second visible light transmission and the first direct solar transmission is about 63% to about 70% as determined in accordance with ISO 9050, second edition, Aug. 15, 2003 (reference number ISO 9050:2003(e)) with a perpendicular measurement.

19. A multiwall sheet, comprising:
three polymer walls, comprising a first outer layer, a second outer layer, and an inner layer, wherein the polymer walls comprise a polymer selected from the group consisting of polycarbonate, polyalkenes, polyetherimides, styrene, and combinations comprising at Least one of the foregoing polymers;
a transverse layer, wherein the transverse layer intersects the walls to form cells; and
a liquid located in the cells;
wherein the multiwall sheet has a visible light transmission at a wavelength of about 400 nm to about 700 nm of greater than or equal to 87% as measured in accordance with ISO 9050, and a direct solar light transmission of about 63% to about 70% as determined in accordance with ISO 9050, second edition, Aug. 15, 2003 (reference number ISO 9050:2003(e)) with a perpendicular measurement.

20. The multiwall sheet of claim 19, wherein the fluid is selected from the group consisting of water, glycerin, polydimethylsiloxane oil, and combinations comprising at least one of the foregoing.

21. The multiwall sheet of claim 19, wherein the polymer comprises polycarbonate.

22. The multiwall sheet of claim 21, wherein the liquid comprises water.

23. A multiwall sheet, comprising:
greater than or equal to three polymer walls, comprising a first outer layer, a second outer layer, and an inner layer;
a transverse layer, wherein the transverse layer intersects the walls to form cells; and
a liquid located in a pre-selected portion of the cells;
wherein the multiwall sheet has a visible light transmission at a wavelength of about 400 nm to about 700 nm of greater than or equal to 85% as measured in accordance with ISO 9050, and a direct solar light transmission of about 63% to about 70% as determined in accordance with ISO 9050, second edition, Aug. 15, 2003 (reference number ISO 9050:2003(e)) with a perpendicular measurement; and
wherein the liquid has a liquid refractive index and the polymer walls have a polymer refractive index, and wherein the liquid refractive index is different than the polymer refractive index.

24. The multiwall sheet of claim 23, wherein the difference in refractive index between the liquid refractive index and the polymer refractive index is greater than or equal to 0.11.

25. A naturally light structure, comprising:
a building structure; and
a roof comprising a multiwall sheet, wherein the multiwall sheet comprises:
greater than or equal to three polymer walls, comprising a first outer layer, a second outer layer, and an inner layer between the first outer layer and the second outer layer;
a transverse layer, wherein the transverse layer intersects the walls to form cells; and
a liquid located in the cells;
wherein the multiwall sheet has a first visible light transmission and a first direct solar transmission;
wherein a second multiwall sheet has a same material and a same design as the multiwall sheet except comprises no liquid, and has a second visible light transmission and a second direct solar transmission;
wherein the first visible light transmission is greater than the second visible light transmission and the first direct solar transmission is about 63% to about 70% as determined in accordance with ISO 9050, second edition, Aug. 15, 2003 (reference number ISO 9050:2003(e)) with a perpendicular measurement; and
wherein the liquid has a liquid refractive index and the polymer walls have a polymer refractive index, and wherein the liquid refractive index is different than the polymer refractive index.

26. The structure of claim 25, wherein the first visible light transmission at a wavelength of about 400 nm to about 700 nm is greater than or equal to 85% as measured in accordance with ISO 9050, and the first direct solar light transmission is about 63% to about 70% as determined in accordance with ISO 9050.

27. The structure of claim 25, wherein the structure is selected from the group consisting of greenhouse, sun-room, and pool enclosure.

28. The structure of claim 27, wherein the structure is a greenhouse.

* * * * *